US005123515A

United States Patent [19]

Zeller

[11] Patent Number: 5,123,515

[45] Date of Patent: Jun. 23, 1992

[54] CHUTE FOR REFUSE DISPOSAL

[76] Inventor: Henry O. Zeller, P.O. Box 13436, Rochester, N.Y. 14613

[21] Appl. No.: 745,746

[22] Filed: Aug. 16, 1991

[51] Int. Cl.[5] .......... B65G 11/20

[52] U.S. Cl. .......... 193/2 R; 193/3; 193/12

[58] Field of Search .......... 193/2 R, 3, 12

[56] References Cited

U.S. PATENT DOCUMENTS 3,968,856 7/1976 Keen et al. .......... 193/12 X
4,603,769 8/1986 Bach et al. .......... 193/12
5,083,651 1/1992 Wiese .......... 193/12

*Primary Examiner*—D. Glenn Dayoan
*Attorney, Agent, or Firm*—Robert J. Bird

[57] ABSTRACT

A refuse chute for mounting on the inside of a sink cabinet door includes a backboard, inner and outer sidewalls extending forward of the backboard, an inclined ramp extending downward from the backboard between the inner and outer sidewalls; and a stop to limit the swing of the door and chute relative to the receptacle. The chute is in operative position relative to the receptacle when the door is partially open, and refuse dropped on the ramp is guided into the receptacle. An upstanding central vane on the ramp helps to make even distribution in the receptacle.

4 Claims, 2 Drawing Sheets

CHUTE FOR REFUSE DISPOSAL

FIELD OF THE INVENTION

This invention is a chute to facilitate placement of refuse in a receptacle.

BACKGROUND INFORMATION

A typical modern kitchen skin is mounted on cabinetry, and has space under it which is enclosed behind a cabinetry door or doors. This space is a convenient location for a receptacle for kitchen refuse, and it is commonly used for that purpose. Ordinarily, one must open the cabinet door, stoop over, and reach in under the sink to put refuse into the receptacle. It is often necessary also to remove the receptacle from under the sink in order to use it. It may be inconvenient for some, such as elderly or tall persons, or persons with back ailments or other loss of dexterity, to do these things.

It is an object of this invention to provide a chute to facilitate use of such a refuse receptacle without the bending and reaching that is ordinarily required, or without moving of the receptacle which is sometimes required.

SUMMARY OF THE INVENTION

The present invention is a refuse chute for mounting on the inside of a sink cabinet door to facilitate placement of refuse in a receptacle behind the door and under the sink. The chute includes a backboard, inner and outer sidewalls extending forward of the backboard, an inclined ramp extending downward from the backboard between the inner and outer sidewalls; and a stop to limit the swing of the door and chute relative to the receptacle. The chute is in operative position relative to the receptacle when the door is partially open, and refuse dropped on the ramp is guided into the receptacle. An upstanding central vane on the ramp helps to make even distribution in the receptacle.

DRAWING

DESCRIPTION

Figure 1:
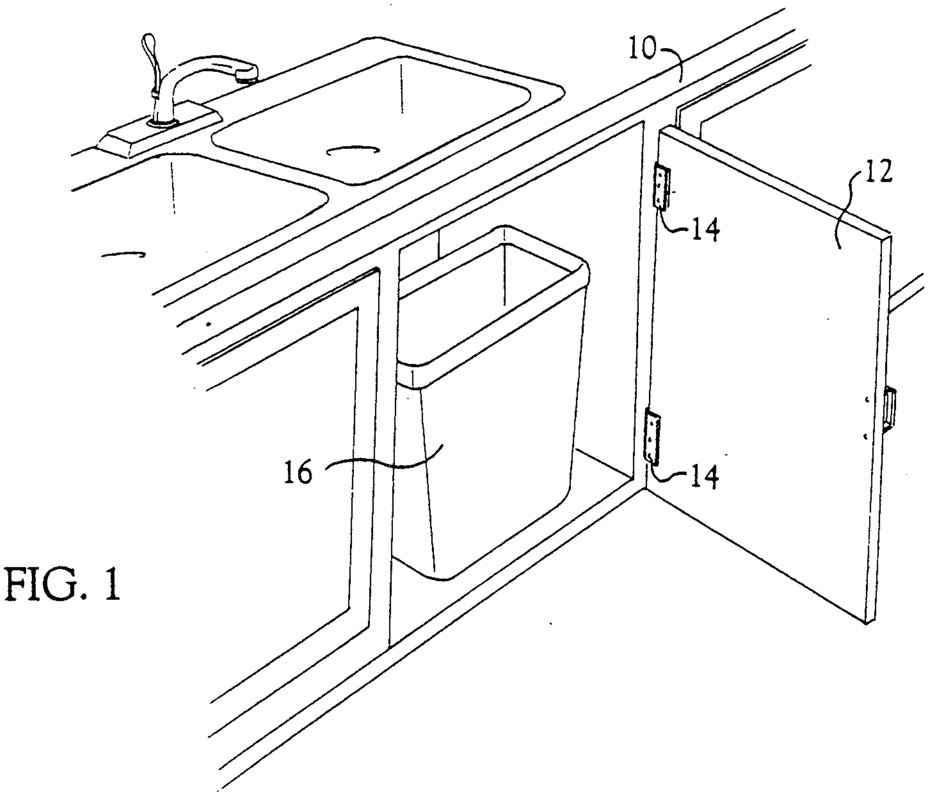
FIG. 1 is a perspective view of a typical kitchen sink and cabinet.

FIG. 1 shows a kitchen sink mounted on a cabinet 10 which includes a cabinet door 12 on hinges 14. The cabinetry provides an aesthetic housing for plumbing and such accessories as garbage disposer and water filter under the sink. The cabinetry also provides a convenient place to keep a waste basket or receptacle 16 and to keep it out of sight. The arrangement in FIG. 1 is typical of what is in general use today.

Figure 2:
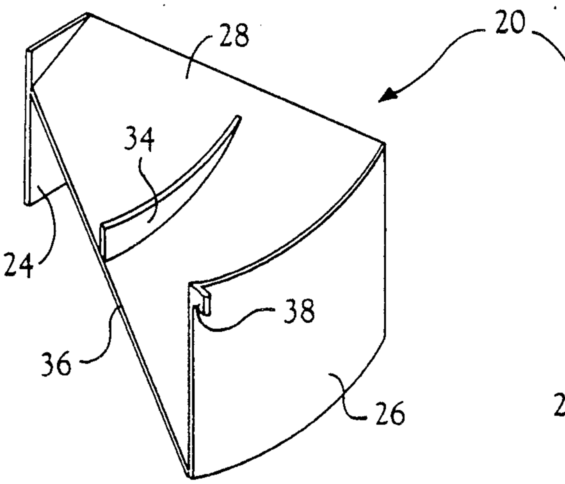
FIG. 2 is a front perspective view of the chute of this invention.
Figure 3:
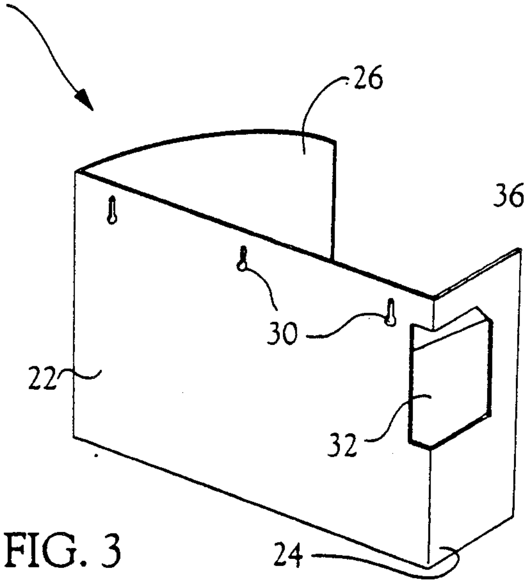
FIG. 3 is a rear perspective view of the chute of this invention.

FIGS. 2 and 3 show a chute 20, which includes a vertical backboard 22, a vertical inner sidewall 24, a vertical outer sidewall 26, and an inclined ramp 28. The ramp 28 is a flat planar member inclined downward from the backboard 22. The ramp 28 includes a central upstanding vane 34. The outer sidewall includes a stop member 38 extending outward. The backboard 22 is shown as a solid or continuous sheet, though it might instead consist of several vertical and cross members.

Figure 4:
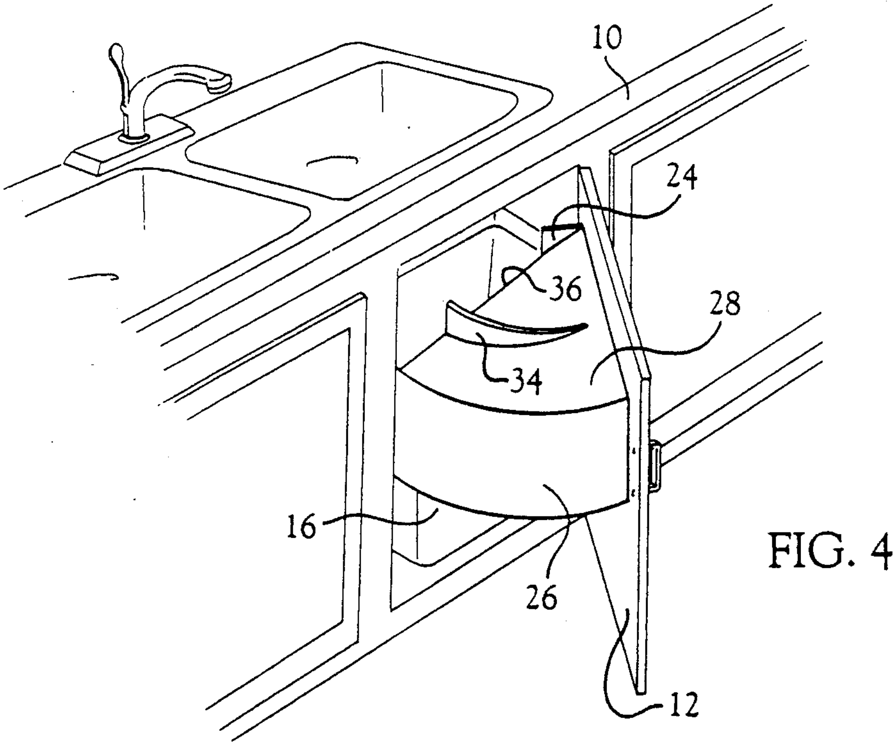
FIGS. 4 and 5 show the chute mounted on the cabinet door.
Figure 5:
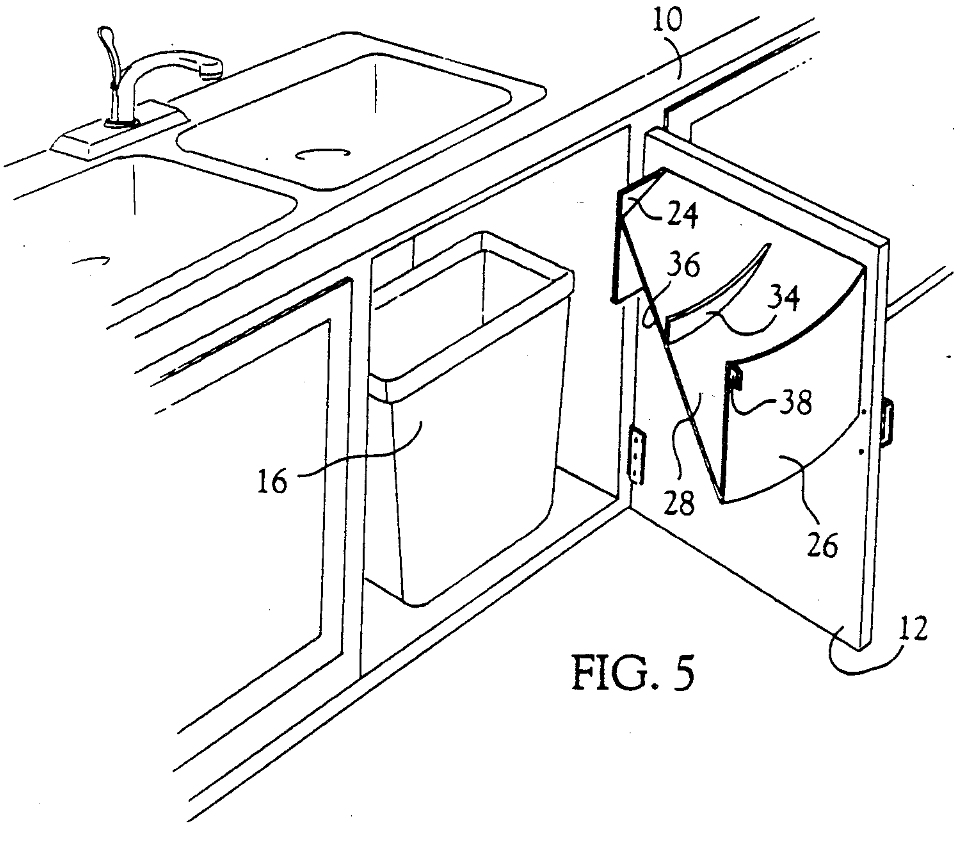

The chute 20 is made to be hung or otherwise secured to the inside of the cabinet door 12, as shown in FIGS. 4 and 5. The backboard 22 includes apertures 30 along its top portion by which to hang the chute on the door 12. The backboard 22 and the inner sidewall 24 are cut away somewhat at their juncture, leaving an opening 32 to prevent interference with the upper door hinge 14. The outer sidewall 26 and the central vane 34 of the chute are curved in the arc of their rotation on the hinges 14 of the cabinet door. This curved configuration maximizes the ramp area that can be swung in and out with the door. The "inner" end of the apparatus is the end near the hinges 14, and the "outer" end is the end near the open end of the door 12.

The height of the chute 20 on the door 12 is such that the chute passes over and clears the receptacle 16 when the door 12 is closed. FIG. 4 shows the door partially open, with the inner edge 36 of the ramp 28 substantially at the plane of the door opening. With the door in this position (or closed slightly more so the edge 36 is entirely over the receptacle 16) an article of refuse such as an empty container, bone, eggshell or the like can simply be dropped vertically on the ramp 28, and it will be guided into the receptacle 16. Stooping and reaching under the sink is not required. The central vane 34 helps to prevent articles from all gravitating to the outer sidewalls 26, and thereby helps to distribute the deposit of articles in the receptacles 16.

In FIG. 4, the stop member 38 (not visible) is in abutment with the inner wall of the cabinet 10. This provides a positive stop for the door 12 and the chute 20, limiting its outward swing to insure that the ramp 28 is in operative position relative to the receptacle 16. The outer sidewall 26 of the chute is flexible enough so that it can easily be flexed inward to clear the stop member 38 from the cabinet 10, freeing the door 12 to open more fully as shown in FIG. 5. In this position, there is full access to the space within the cabinet 10 under the kitchen sink.

The foregoing description of a preferred embodiment of this invention, including any dimensions angles or proportions, is intended as illustrative. The concept and scope of the invention are limited only by the following claims and equivalents thereof.

What is claimed is:

1. A chute adapted for mounting on the inside of a cabinet door to facilitate placement of refuse in a receptacle disposed behind said door and below said chute, said chute including:
   - a backboard adapted for mounting on said cabinet door;
   - an inner sidewall extending forward of the inner end of said backboard;
   - an outer sidewall extending in a curve forward of the outer end of said backboard; and
   - an inclined ramp extending downward from said backboard between said inner and outer sidewalls;
   - whereby said chute is in operative position relative to said receptacle when said door is partially open, and refuse dropped on said ramp is guided into said receptacle.

2. A chute as defined in claim 1, further including means to limit the outward swing of said door and said chute relative to said receptacle.

3. A chute as defined in claim 1, said ramp including a central upstanding vane extending substantially parallel to said outer sidewall.

4. A chute adapted for mounting on the inside of a cabinet door to facilitate placement of refuse in a receptacle disposed behind said door and below said chute, said chute including:

a vertical backboard adapted for mounting on said cabinet door;

a vertical inner sidewall extending forward of the inner end of said backboard;

a vertical outer sidewall extending forward of the outer end of said backboard, said sidewall including a stop member extending outward thereof to limit the outward swing of said door and said chute relative to said receptacle, said outer sidewall being flexible inward to render said stop member inoperative; and an inclined rap extending downward from said backboard between said inner and outer sidewalls, said ramp including a central upstanding vane extending substantially parallel to said outer sidewall;

said outer sidewall and said vane being curved in the arc of their rotation on said door;

whereby said chute is in operative position relative to said receptacle when said door is partially open, refuse dropped on said ramp is guided into said receptacle, and said central vane distributes the deposit of refuse in said receptacle.

* * * * *